TRANSISTOR RECEIVER SQUELCH CIRCUIT
Filed May 15, 1958
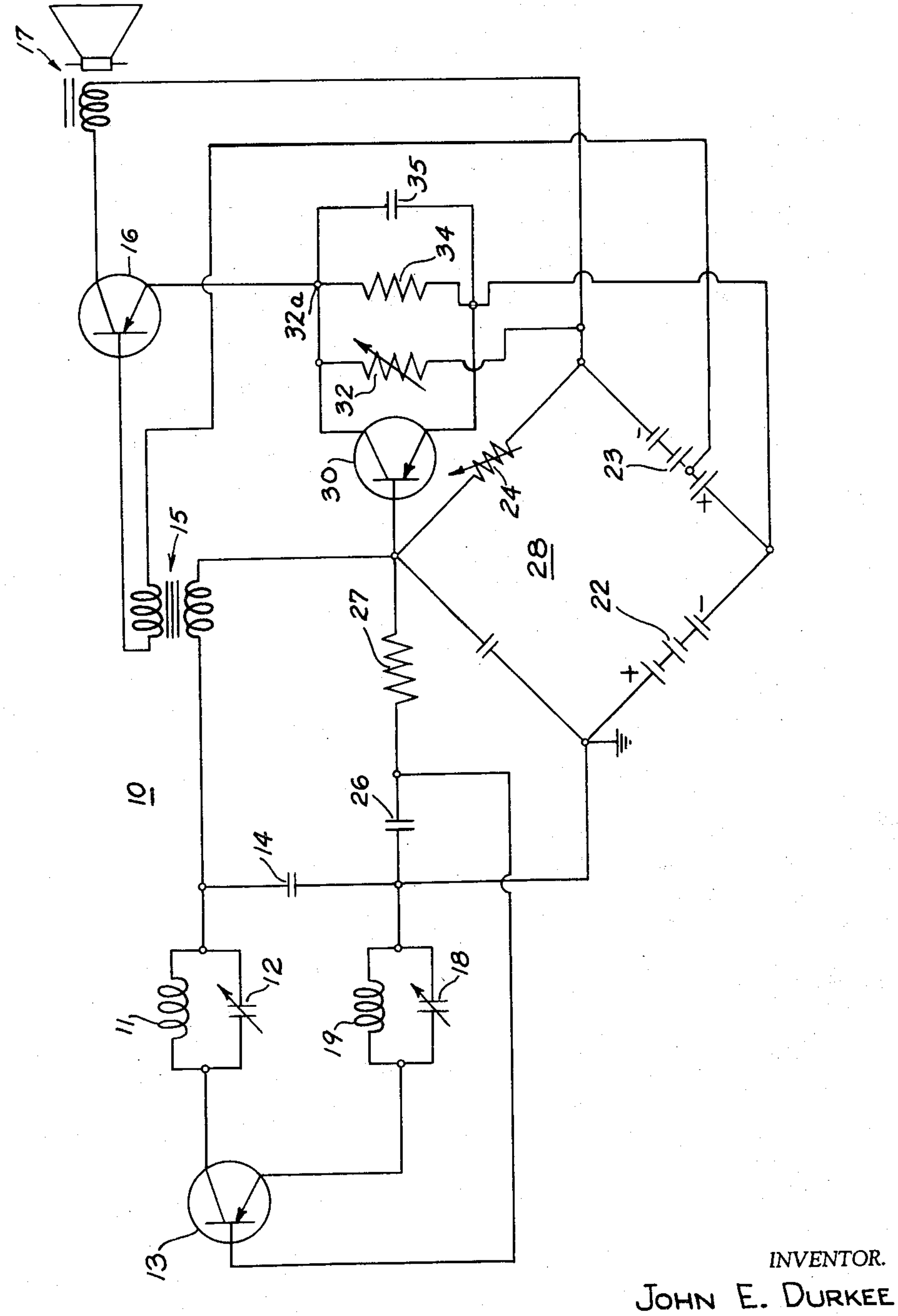
INVENTOR.
JOHN E. DURKEE
BY
[signature]

United States Patent Office 2,982,854
Patented May 2, 1961

2,982,854

TRANSISTOR RECEIVER SQUELCH CIRCUIT

John E. Durkee, Conesus, N.Y., assignor to General Dynamics Corporation, Rochester, N.Y., a corporation of Delaware Filed May 15, 1958, Ser. No. 735,533

4 Claims. (Cl. 250—20)

The present invention relates to radio receivers and it particularly relates to a new and improved bridge for use in a squelch circuit of a super-regenerative radio receiver.

Radio receivers employing super-regenerative detectors suffer from the disadvantage that during the absence of a received carrier wave an undue amount of audio noise signals appear in the output of the detector and unless the audio amplifying stages of the receiver are squelched, result in the development of unpleasant audible noise by the receiver. Therefore, if a super-regenerative receiver is to be used in a system in which a carrier is transmitted only when it is desired to transmit intelligence from the transmitter to the receiver, means should be provided for squelching the audio stages of the receiver during those periods when the carrier wave is not transmitted. One way of detecting the presence or absence of a received carrier and thus controlling the squelching of the audio stages of the receiver is to provide a D.C. bridge circuit which is made sensitive to the D.C. current flowing in the output of the detector circuit and to provide means such, for example, as a D.C. amplifier, for amplifying the output of the bridge to control the bias on one or more of the audio amplifiers in the receiver. A simple resistance bridge suffers from the disadvantage that it produces a continuous and substantial battery drain whenever the receiver is turned on irrespective of whether or not a signal is being received.

Therefore, an object of the present invention is to provide a new and improved bridge circuit which draws a minimum of current.

Another object of the present invention is to provide a new and improved squelch circuit employing a bridge which draws a minimum amount of power.

A further object of the present invention is to provide a new and improved radio receiver of the super-regenerative type which includes an audio squelch circuit having a low power consuming bridge therein.

Briefly, the above and further objects are realized in accordance with the present invention by providing a bridge which includes reference batteries of standard value and low impedance in two of the arms, a resistor in another of the arms, and the output resistance of a device, such as a detector, whose change in resistance is to be detected by the bridge in the fourth arm. This detector and the device which is responsive to the output of the bridge are energized by the reference batteries included in the bridge itself thereby to minimize the number of components employed in the system while also minimizing the current drained from the batteries.

Many other objects and advantages of the present invention will become apparent from a consideration of the following detailed description when taken in conjunction with the following drawing which is a schematic circuit diagram of a super-regenerative receiver embodying the low power consuming bridge of the present invention.

Referring now to the drawing, a radio receiver 10 includes a tuned input circuit comprising an antenna coil 11 for intercepting an audio modulated frequency signal, and a tuning capacitor 12 which is connected across the coil 11. The coil 11 and the capacitor 12 provide the usual tank circuit for selecting the desired radio frequency signal from the various signals which may be intercepted by the antenna coil 11. The antenna coil 11 and the tuning capacitor 12 are serially connected in the collector circuit of a PNP type transistor 13 which provides the necessary non-linearity for demodulating or detecting the received audio modulated signal to provide in the collector circuit thereof the audio components of the received wave. An RF bypass capacitor 14 is connected between one end of the antenna coil 11 and the emitter circuit of the transistor 13 to separate the radio frequency components of the collector current from the detected audio frequency components which are coupled by means of a transformer 15 to the base of a PNP junction transistor 16. The transistor 16 provides the necessary amplification of the detected audio signal to drive a suitable loudspeaker 17 whose voice coil is connected in the collector circuit of the transistor 16.

The transistor 13 is of the surface barrier type which includes a sufficient internal capacitance between the collector and the emitter electrodes thereof to render the detector circuit continuously oscillatory. Therefore, in order to bleed off part of this feedback signal to prevent continuous oscillation of the detector circuit, a capacitor 18 is connected between the emitter of the transistor 13 and ground. An inductor 19 is connected in parallel with the capacitor 18 to maintain the emitter at D.C. ground potential. The transistor 13 is energized by two sets of batteries 22 and 23 which are serially connected with an adjustable resistor 24 in the emitter-to-collector circuit. The base of the transistor 13 is connected to ground and thus to the positive pole of the battery set 22 through a capacitor 26, and a resistor 27 is connected between the base of the transistor 13 and the adjustable resistor 24 so that the potential at the base of the transistor 13 is dependent upon the voltage across the capacitor 26. The circuit including the capacitor 26 and the resistors 24 and 27 provides the necessary blocking to render the detector circuit super-regenerative so that the transistor 13 periodically oscillates at a quench frequency which is substantially less than the frequency of the received carrier.

It has been found that the D.C. collector-to-emitter current in the transistor 13 changes by a small amount between the condition when no carrier is received and the condition when a carrier is received. In order to utilize the decrease in the collector-to-emitter current, which occurs when a carrier is initially received, to unblock the audio amplifier circuit including the transistor 16, the increase in the emitter-to-collector resistance is effectively amplified by a D.C. bridge 28. Three arms of the bridge 28 respectively comprise the batteries 22 and 23 and the resistor 24 and the fourth arm comprises the emitter-to-collector resistance of the transistor 13. The batteries 22 and 23 are substantially identical having equal output voltages and equal internal resistances and the value of the resistor 24 is adjusted to equal the collector-to-emitter resistance of the transistor 13. The batteries 22 and 23 each provide the necessary voltage to power the transistor 13, so that with two batteries operating into the equal resistance arms of the bridge 28, the proper collector-to-base operating voltage is provided.

The output of the bridge 28 is taken between the junction of the batteries 22 and 23 and the junction of the resistors 24 and 27 and applied between the emitter and base of a transistor 30. The transistor 30 is connected in a D.C. amplifier circuit which controls the bias voltage provided between the emitter and base of the transistor 16 and is driven by the output of the bridge 28.

In the operation, the value of the resistor 24 is adjusted so that in the absence of a carrier wave the transistor 30 is nonconductive and, therefore, substantially no voltage drop occurs across a resistor 34 connected between the collector of the transistor 30 and the negative pole of the battery 23. In the presence of a carrier wave, the output voltage from the bridge 28 causes the transistor 30 to conduct heavily and, therefore, to develop a relatively high voltage across the resistor 34. This drops the voltage on the emitter of the transistor 16 below the voltage at the base thereof so as to condition the transistor 16 for amplifying the output signal from the detector.

In the presence of a received carrier, the bias voltage between the base and emitter of the transistor 16 is determined by the biasing circuit connected to the emitter of the transistor 16 and which includes a resistor 32 and a capacitor 35 connected in parallel between the emitter of the transistor 16 and the positive pole of the set of batteries 23. Since this set of batteries preferably comprises three batteries of substantially equal value, the base of the transistor 16 is positive with respect to its emitter when the transistor 30 is nonconductive, and the tranistor 16 cannot amplify the detected signal.

There is thus provided in accordance with the present invention a squelch circuit including one or more batteries having a standard or reference value and which also energizes the overall receiver. Moreover, the circuit drained from those batteries is relatively low and is substantially equalized between the batteries so as to provide a receiver in which frequent changing of the batteries is unnecessary.

By way of illustration only, and not by way of limiting this application thereto, the following component values have been found to give efficient operation in a particular construction of the disclosed radio receiver.

| | |
|---|---|
| Transistor 13 | SB103. |
| Transistor 16 | 2N132. |
| Transistor 30 | 2N132. |
| Resistor 24 | 20 kilohms maximum. |
| Resistor 27 | 33 kilohms. |
| Resistor 32 | 10 kilohms maximum. |
| Resistor 34 | 10 kilohms. |
| Battery 22 | Three 1.3 volt mercury cells (4 volts). |
| Battery 23 | Three 1.3 volt mercury cells (4 volts). |

While there has been described what is at present considered to be a preferred embodiment of the invention, it will be understood that various modifications may be made therein which are within the true spirit and scope of the invention as defined in the appended claims.

What is claimed as new and desired to be secured by Letters Patent of the United States is:

1. A radio receiver comprising a super-regenerative detector including a transistor having at least a collector electrode and an emitter electrode, an audio amplifier responsive to detected signal components in the collector circuit of said transistor for driving a loud-speaker, a squelch circuit for selectively biasing said audio amplifier to respond to said detected signal components when a carrier wave of predetermined frequency is received by said receiver, said squelch circuit including a direct current bridge and a direct current amplifier responsive to the output of said bridge for controlling the bias on said amplifier, said bridge being energized by a first low impedance battery serially connected in one arm thereof and a second low impedance battery serially connected in another arm thereof, and connections between said batteries and the circuits of said receiver for energizing said receiver only by means of said batteries.

2. A radio receiver as set forth in claim 1 wherein the output of said bridge is taken between the junction of said batteries and a point remote from both of said batteries.

3. A radio receiver as set forth in claim 2 wherein said point is connected to one of said batteries by a resistance device and is connected to the other of said batteries by the internal collector-to-emitter resistance of said transistor.

4. In a radio receiver comprising a detector and an amplifier of detected signals, a squelch circuit for selectively biasing said amplifier beyond cutoff, said squelch circuit including bridge means responsive to a characteristic of said detector for determining the bias on said amplifier, a first battery serially connected in one arm of said bridge, a second battery serially connected in another arm of said bridge, and means connecting said batteries to said detector and said amplifier for energization thereof.

References Cited in the file of this patent

UNITED STATES PATENTS

| | | |
|---|---|---|
| 2,096,625 | Brown | Oct. 19, 1937 |
| 2,191,315 | Guanella | Feb. 20, 1940 |
| 2,649,571 | Smith | Aug. 18, 1953 |
| 2,802,939 | Klehfoth | Aug. 13, 1957 |